US006266599B1

United States Patent
Van Zanten et al.

(10) Patent No.: US 6,266,599 B1
(45) Date of Patent: Jul. 24, 2001

(54) METHOD AND DEVICE FOR ADJUSTING AN AMOUNT OF MOVEMENT REPRESENTING THE VEHICLE MOTION

(75) Inventors: Anton Van Zanten, Ditzingen; Thomas Ehret, Moeglingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/077,163

(22) PCT Filed: Jun. 9, 1997

(86) PCT No.: PCT/DE97/01215

§ 371 Date: Aug. 25, 1998

§ 102(e) Date: Aug. 25, 1998

(87) PCT Pub. No.: WO98/13240

PCT Pub. Date: Apr. 2, 1998

(30) Foreign Application Priority Data

Sep. 24, 1996 (DE) .............................................. 196 39 092
Mar. 3, 1997 (DE) .............................................. 197 08 508

(51) Int. Cl.$^7$ ...................................................... B60T 8/24
(52) U.S. Cl. ............................................. 701/71; 303/146
(58) Field of Search ................................ 701/71, 72, 75, 701/80, 82, 70, 41; 180/197; 303/146, 24.1, 140, 191

(56) References Cited

U.S. PATENT DOCUMENTS

| 4,741,207 | * | 5/1988 | Spangler ................................. 73/148 |
| 5,015,006 | * | 5/1991 | Takehara et al. ..................... 280/707 |
| 5,188,434 | * | 2/1993 | Ruf et al. ............................... 303/111 |
| 5,211,453 | * | 5/1993 | Van Zanten et al. ................. 303/111 |
| 5,265,019 | * | 11/1993 | Harara et al. ..................... 364/424.05 |
| 5,311,431 | * | 5/1994 | Cao et al. ......................... 364/424.05 |
| 5,356,238 | * | 10/1994 | Musil et al. .......................... 404/84.1 |
| 5,401,115 | * | 3/1995 | Musil et al. ........................... 404/72 |
| 5,440,923 | * | 8/1995 | Arnberg et al. ........................ 73/146 |
| 5,455,770 | * | 10/1995 | Hadeler et al. ................. 364/426.01 |
| 5,471,386 | * | 11/1995 | Hrovat et al. .................... 364/426.02 |
| 5,480,219 | * | 1/1996 | Kost et al. ............................ 303/146 |
| 5,508,929 | * | 4/1996 | Harada ............................ 364/424.05 |
| 5,579,245 | * | 11/1996 | Kato ..................................... 364/559 |
| 5,668,724 | * | 9/1997 | Ehret et al. ............................ 701/80 |
| 5,694,319 | * | 12/1997 | Suissa et al. ................... 364/424.051 |
| 5,931,880 | * | 8/1999 | Brachert ................................. 701/38 |

FOREIGN PATENT DOCUMENTS 196 15 311     10/1997 (DE) .

OTHER PUBLICATIONS

A. Van Zanten et al., "FDR—driving dynamics control by Bosch", Automobiltechnische Zeitschrift (ATZ), vol. 96, No. 11 (1994), pp. 674–689.

* cited by examiner

*Primary Examiner*—Tan Nguyen
*Assistant Examiner*—Dalena Tran
(74) *Attorney, Agent, or Firm*—Kenyon & Kenyon (57) ABSTRACT

A device and a method of controlling a movement parameter representing the movement of the vehicle, includes a first arrangement for detecting at least the transverse acceleration of the vehicle is proposed. The device also contains a second arrangement at least for determining a transverse acceleration component which depends on the transverse slope of the road surface and/or for correcting at least the transverse acceleration of the vehicle at least as a function of the transverse acceleration component. In the second arrangement a status of the vehicle whereby the transverse acceleration component which depends on the transverse slope of the road surface is determined at least as a function of the slip angle occurring on the rear axle of the vehicle.

12 Claims, 4 Drawing Sheets

FIG. 4

METHOD AND DEVICE FOR ADJUSTING AN AMOUNT OF MOVEMENT REPRESENTING THE VEHICLE MOTION

BACKGROUND INFORMATION +ps German Patent Application No.

The patent application filed with the German Patent Office 196 15 311.5 describes a method and a device for controlling a parameter of movement which represents the movement of the vehicle, where a transverse acceleration component which depends on the transverse slope of the road surface is determined. This transverse acceleration component is used to correct the measured transverse acceleration of the motor vehicle.

The transverse acceleration component which depends on the transverse slope of the road surface is determined in a stable state of the vehicle which is described by the yaw and the transverse acceleration of the vehicle. To determine the stable state of the vehicle, a brief, active action which is independent of the control process can be performed by the control system in such a way as to have a slight influence on the yaw of the vehicle. The stable state of the vehicle is established when a change in transverse acceleration of the vehicle can be detected on the basis of the intended change in the yaw of the vehicle. If the vehicle is in its stable state, then the transverse acceleration component which depends on the transverse slope of the road surface is determined on the basis of the values determined in this state for the longitudinal acceleration of the vehicle, the transverse acceleration of the vehicle and the yaw of the vehicle.

Systems for relating the driving dynamics of a vehicle are described, e.g., in the article "FDR—driving dynamics control by Bosch" published in the automotive journal Automobiltechnische Zeitschrift (ATZ), vol. 96, no. 11 (1994), pages 674–689. This article also describes that various special situations such as an inclined road surface are taken into account in the control by the driving dynamics controller.

The object of the present invention is to improve on the determination of the transverse acceleration component which depends on the transverse slope of the road surface.

SUMMARY OF THE INVENTION

One of the advantages of the present invention is that with the device and the method according to the present invention for determining the transverse acceleration component which depends on the transverse slope of the road surface, there is no need for short, active interventions by the control system that are independent of the control process to have a slight influence on the yaw of the vehicle.

To be able to do without such actions, the slip angle on the rear axle of the vehicle is determined. Depending on the slip angle thus determined, a vehicle status is determined wherein the transverse acceleration component which depends on the transverse slope of the road surface is determined as a function of at least the values obtained for the yaw of the vehicle, the transverse acceleration of the vehicle and the longitudinal acceleration of the vehicle. The transverse acceleration component thus determined is checked for plausibility and is preferably used to correct the transverse acceleration of the vehicle. Furthermore, this can also be used to correct the yaw of the vehicle, for example, or to correct the slip angle on the rear axle of the vehicle.

For the determination of the slip angle on the rear axle of the vehicle, it is advantageous to determine the slip angles as a function of a value for the float angle of the vehicle and the values obtained for the yaw of the vehicle and the longitudinal velocity of the vehicle. The float angle is determined on the basis of at least the values obtained for the yaw of the vehicle, the transverse acceleration of the vehicle and the longitudinal velocity of the vehicle. At the same time, it is also advantageous in determining the float angle to take into account actions performed on the actuators independently of the driver. For example, when actuators that can influence the braking torque of each wheel individually are operated independently of the driver, this can also be detected for this purpose.

Depending on the slip angle determined, the vehicle status, where the transverse acceleration component which depends on the transverse slope of the road surface is preferably determined by comparing the slip angle obtained with a predetermined threshold value. For example, when the value of the slip angle obtained is larger than the threshold value, then the vehicle status to be detected exists.

The vehicle status to be determined is one which occurs when the vehicle is traveling in a stable manner on a road surface with a transverse slope, in particular when it is traveling in a stable manner on a rock wall or in a steep curve. If the slip angle is determined on the basis of the transverse acceleration determined with a sensor in such a vehicular movement, the slip angle assumes large values. The reason for this is that the measured, uncorrected transverse acceleration is falsified by the transverse acceleration component which depends on the transverse slope of the road surface. Likewise, an unstable traveling condition of the vehicle, such as that which occurs when the vehicle skids, is characterized in that the slip angle occurring at the rear axle of the vehicle assumes large values. However, in this case this is related to the physical conditions which prevail in a skid. Consequently, another criterion is necessary for an unambiguous determination of the vehicle condition which is to be detected.

It is also advantageous to determine the driver's reaction, i.e., the actions taken by the driver. For example, the actuators with which the braking torques acting on the individual wheels of the vehicle can be influenced can be monitored for this purpose. Likewise, monitoring of the steering angle set by the driver is another option. Depending on this monitoring, this vehicle status prevails when, in addition to the criterion derived from the slip angle, at least the braking torques produced by the driver are smaller than a predetermined threshold or the gradient of the steering angle is smaller than a predetermined threshold.

To be able to test the determined value of the transverse acceleration component for plausibility, another advantageous option is a comparison whereby a first value for the yaw of the vehicle, which is determined on the basis of the measured transverse acceleration component, is compared with a second value for the yaw of the vehicle which is determined with a rotation sensor. If this comparison shows that the value for the transverse acceleration component is plausible, this value is used for correcting at least the transverse acceleration of the vehicle.

DETAILED DESCRIPTION OF THE DRAWINGS

The present invention is based on a control system for influencing the performance of a vehicle. In particular, the present invention is based on a system for controlling the driving dynamics of a motor vehicle. For example, the device and the method according to the present invention can also be used in an antilock braking system or in a torque control system if these systems are equipped with the proper sensors.

First, by way of introduction, the problems that result when using the transverse acceleration determined with a transverse acceleration sensor in control systems are explained below.

Measurement of the transverse acceleration with a transverse acceleration sensor takes place in an inertial system. Thus, the value for the measured transverse acceleration includes not only the transverse forces acting on the vehicle due to the movement of the vehicle but also the forces caused by a road surface with a transverse slope. On the other hand, the control methods implemented in the above-mentioned control systems are usually based on coordinate systems with the road surface as a fixed reference for calculation of the required quantities. Such coordinate systems with the road surface as a fixed reference have the property that the road surface in them does not have any transverse slope, and consequently the transverse acceleration used in them also has no components caused by a transverse slope of the road surface. Because of this situation—measured transverse acceleration in an inertial system and required transverse acceleration in a coordinate system with the road surface as a fixed reference—it is possible to make a mistake if the transverse acceleration measured in an inertial system were used directly, without correction, in a coordinate system with the road surface as a fixed reference.

Using the device and the method according to the present invention, the transverse acceleration component which depends on the transverse slope of the road surface is determined, so a correction of at least the measured transverse acceleration of the vehicle is possible.

Figure 1:
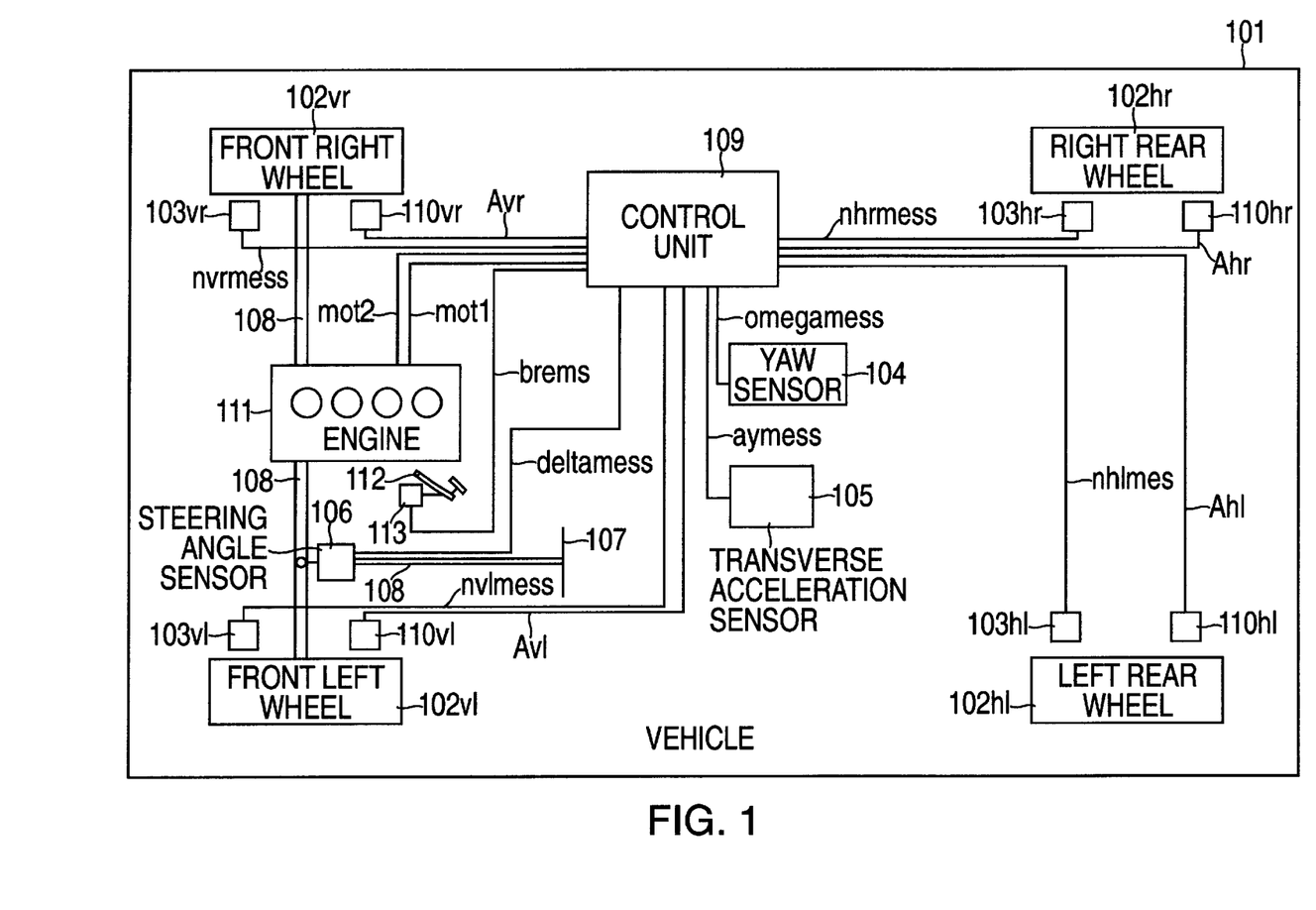
FIG. 1 shows a vehicle including an exemplary system for regulating driving dynamics.

FIG. 1 shows a vehicle 101 with wheels 102$vr$, 102$vl$, 102$hr$ and 102$hl$. The simplified notation 102$ij$ is used below for the wheels of the vehicle. The index i indicates whether the wheel is on the rear axle (h) or on the front axle (v). The index j shows the assignment to the right (r) or left (1) side of the vehicle. This notation with the two indices i and j is used for all variables and components accordingly.

A wheel rotational speed sensor 103$ij$ is provided for each wheel 102$ij$. The signal nijmess generated by each wheel rotational speed sensor 103$ij$ is sent to control unit 109. In addition to wheel rotational speed sensors 103$ij$, other sensors are also provided in vehicle 101. These include a rotation or yaw sensor 104, whose signal omegamess is also sent to control unit 109. A transverse acceleration sensor 105 generates a signal aymess, which is also sent to control unit 109. In addition, the vehicle also has a steering angle sensor 106 with which the steering angle set on the front wheels by the driver using steering wheel 107 and steering linkage 108 is determined. The signal deltamess detected by steering angle sensor 106 is sent to control unit 109. The instantaneous engine characteristics mot1 such as the engine speed and/or throttle valve setting and/or ignition angle are sent to control unit 109 by engine 111. Furthermore, control unit 109 receives a signal brems which is assigned to brake pedal 112 and with which a braking operation performed by the driver is indicated to control unit 109. For example, a switch can be used for the detection means (arrangement) 113.

In control unit 109, the signals sent to it are processed and evaluated, and actuating signals are output according to the control of the vehicle driving dynamics. It is conceivable for control unit 109 to generate actuating signals Aij with which actuators 110$ij$ which are assigned to wheels 102$ij$ and preferably represent brakes can be influenced. Furthermore, the output of an actuating signal mot2 with which the driving torque delivered by engine 111 can be influenced is also conceivable.

Figure 2:
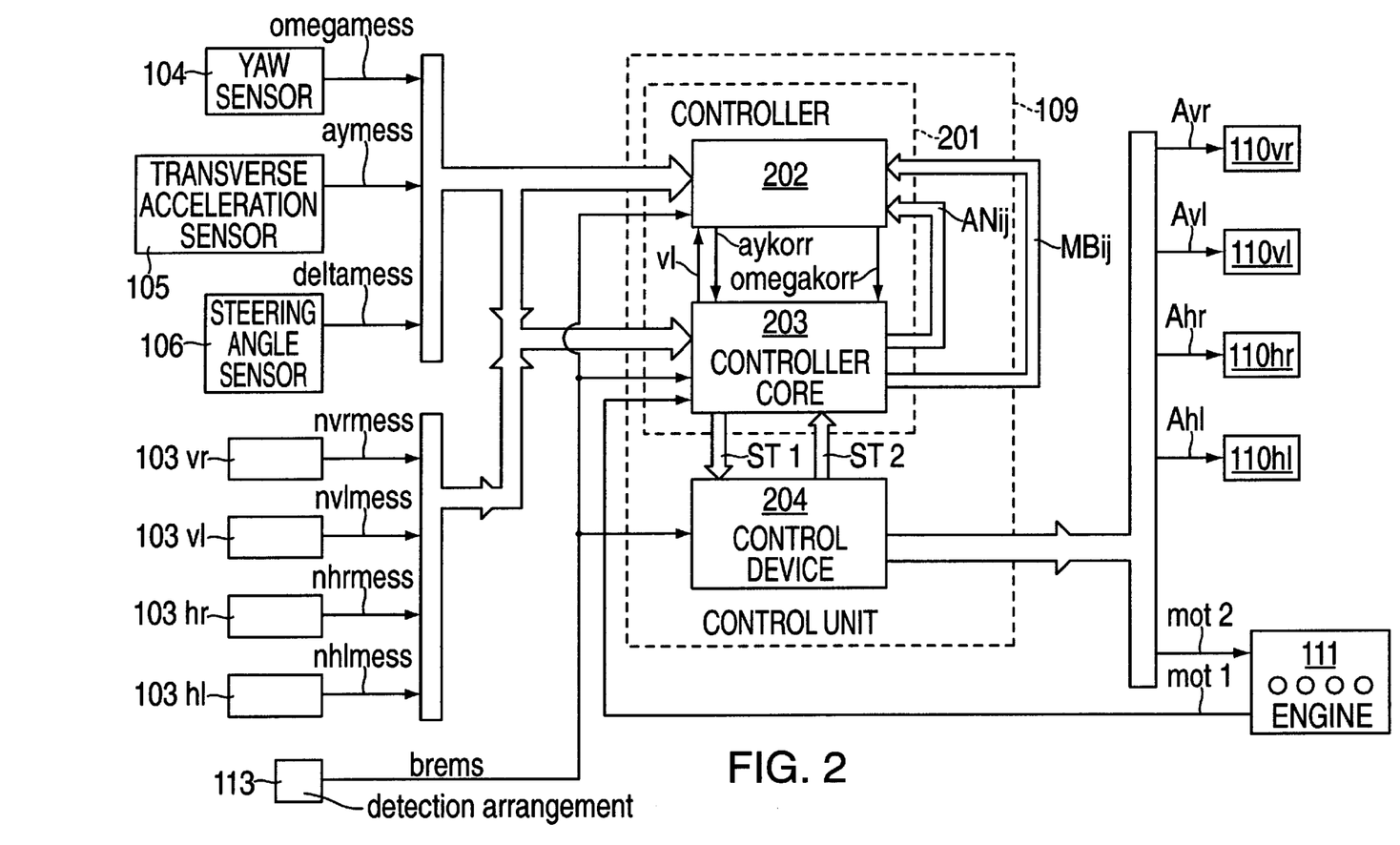
FIG. 2 shows sensors and actuators utilized in a system for regulating the driving dynamics of a motor vehicle illustrated in FIG. 1, in addition to a design of a control unit used in this system for the device according to the present invention.

FIG. 2 shows the design of control unit 109 which is relevant for the device and method according to the present invention. Control unit 109 includes a controller 201 and a control device 204 for actuators 110$ij$ and engine 111.

Controller 201 in turn includes two components. First, it contains a means (an arrangement) 202 with which a transverse acceleration component which depends on the transverse slope of the road surface is at least determined and with which at least the transverse acceleration aymess of the vehicle determined with sensor 105 is corrected. Furthermore, controller 201 contains a controller core 203, in which a control concept that is required for the driving dynamics control, for example, is processed.

The signals detected with sensors 104, 105 and 106, representing the variables which describe the movement of the vehicle, are sent to means 202. At the same time, these signals together with the signals nijmess which represent the wheel velocities and are detected with wheel rotational speed sensors 103$ij$ are sent to block 203. The signal brems which describes the operation of the brake pedal by the driver and is generated by detection means 113 is sent to blocks 202, 203 and 204. In addition, the instantaneous engine characteristics mot1 are sent to block 203.

A quantity vl representing the longitudinal velocity of the vehicle is determined in block 203 in a known manner at least as a function of the wheel velocities nijmess. In addition to using the wheel velocities, it is also conceivable to take into account the yaw and transverse acceleration of the vehicle in determination of longitudinal velocity vl. First, the measured longitudinal velocity vl is processed internally in controller core 203. Second, longitudinal velocity vl is sent to block 202.

In addition to longitudinal velocity vl, signals MBij which are determined in controller core 203 and which represent the braking torques acting on the individual wheels and generated by actuators 110$ij$ are also sent to block 202. Second, block 202 also receives signals ANij which are likewise determined in block 203 and with which the number of actions performed on actuators 110$ij$ independently of the driver to control the quantity representing the movement of the vehicle are also determined.

Depending on the signals sent to block 202, a vehicle condition is ascertained for which a transverse acceleration component which depends on the transverse slope of the road surface is determined. After it is determined, the transverse acceleration component is tested for plausibility. If this test indicates that the transverse acceleration is plausible, it is used for correcting at least the transverse acceleration aymess of the vehicle, which is detected with sensor 105. In addition to correcting the transverse acceleration, a correction of the yaw omegamess of the vehicle, detected with sensor 104, is also conceivable.

If the transverse acceleration component, which depends on the transverse slope of the road surface, is plausible, the corrected transverse acceleration aykorr and corrected yaw omegakorr are therefore sent from block 202 to block 203. Thus, the corrected values for the transverse acceleration and yaw of the vehicle can be used in regulating the movement parameter representing the movement of the vehicle, said regulation taking place in controller core 203.

However, if it is found in the test which is performed in block 202 that the transverse acceleration component is not plausible, no correction of transverse acceleration or yaw of the vehicle is performed. Consequently, no corrected values for these two variables are delivered to block 203. The regulation which takes place in block 203 is performed on the basis of the quantities detected by the sensors.

The control concept implemented in controller core 203 may be, for example, a concept for controlling the vehicle driving dynamics, such as that known, for example, from the publication "FDR—driving dynamics control by Bosch" which appeared in the automotive journal Automobiltechnische Zeitschrift (ATZ), vol. 96, no. 11 (1994), pages 674–689.

At least the following signals or parameters are sent to controller core 203 for this purpose: the parameters nijmess, omegamess, aymess and deltamess which describe the movement of the vehicle and are detected by sensors 103$ij$, 104, 105 and 106. The signal brems and the engine characteristics mot1. Furthermore, the corrected signals aykorr and omegakorr generated in block 202 are sent to block 203, if present. In addition to these signals, controller core 203 also receives signals ST2 generated by block 204 of the control device for the actuators, with which controller core 203 can be notified of the status of control device 204, for example. Depending on these signals, controller core 203 generates signals ST1 which are required for regulating the movement parameter representing the movement of the vehicle and are sent to controlling device 204.

Controlling device 204 converts signals ST1 supplied to it into signals for controlling actuators 110$ij$ and for influencing engine 111. It thus generates signals Aij, for example, for controlling actuators 110$ij$ with which the braking torques acting on the individual wheels of the vehicle can be influenced. Likewise, controlling device 204 generates actuating signal mot2 with which the driving torque delivered by engine 111 can be influenced.

Figure 3:
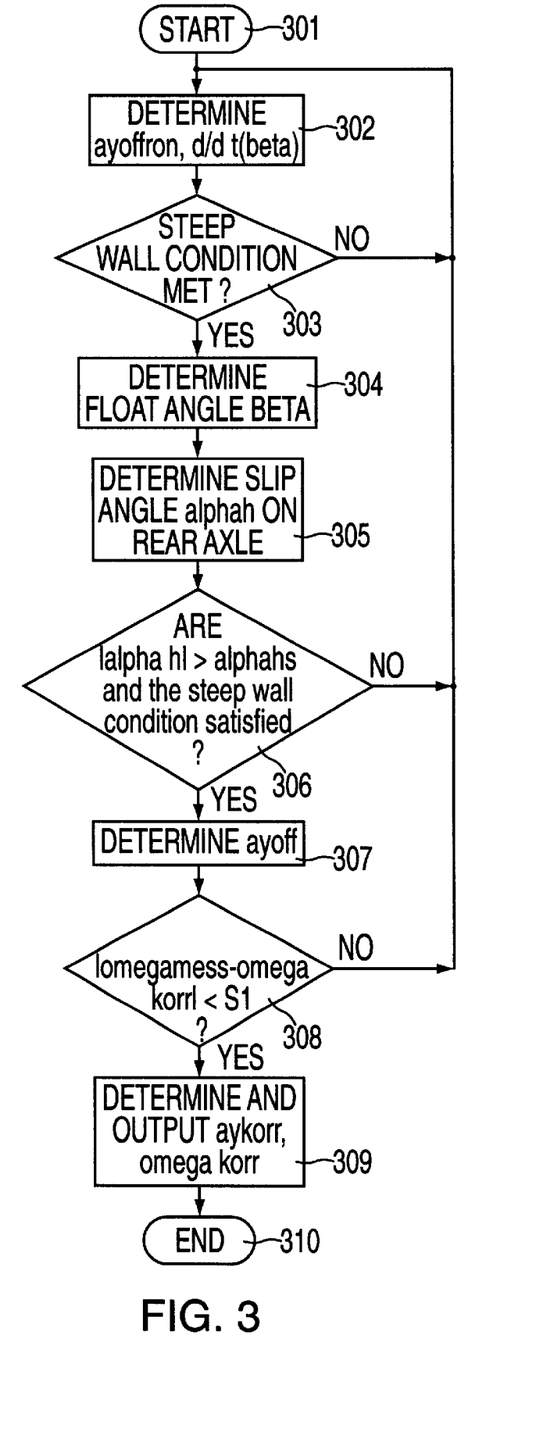
FIG. 3 shows a flow chart for a process according to the present invention which executes in the device according to the present invention for determining the transverse acceleration component which depends on the transverse slope of the road surface and for correcting at least the transverse acceleration of the vehicle.

FIG. 3 shows with the help of a flow chart the process according to the present invention which takes place in the device according to the present invention at least to determine the transverse acceleration component depending on the transverse slope of the road surface.

Determination of the transverse acceleration component which depends on the transverse slope of the road surface begins with a step 301. Then step 302 is performed following step 301. In step 302 a rough value ayoffroh for the transverse acceleration component ayoff, which depends on the transverse slope of the road surface, and a change in float angle d(beta)/dt, are determined. The rough value ayoffroh for the transverse acceleration component ayoff is determined as a function of the longitudinal velocity vl of the vehicle, the transverse acceleration aymess of the vehicle which is determined with sensor 105 and the yaw omegamess of the vehicle which is determined with sensor 104. The change in float angle d(beta)/dt is also determined as a function of these quantities.

Following step 302, step 303 is carried out. In this step, a check is performed to determine whether the steep wall condition is met (the definition of the steep wall condition is explained in conjunction with FIG. 4). If the steep wall condition is met (which in this case is a sign that the vehicle must be on a road surface with a transverse slope), then step 304 is carried out next. However, if the steep wall condition is not met, the system returns to step 302.

In step 304 the float angle beta of the vehicle which prevails in the instantaneous status of the vehicle is determined. This is accomplished preferably by integration of the change in float angle d(beta)/dt. Thus, the determination of the float angle is based on the transverse acceleration aymess determined with sensor 105, the yaw omegamess determined with sensor 104 and longitudinal velocity vl of the vehicle.

In this connection, it should be pointed out that unnecessary driver-independent actions on actuators 110$ij$, for example, may occur when the vehicle enters a steep curve on the basis of the time required for determining the corrected transverse acceleration. With these actions, the control system attempts to control the parameter representing the movement of the vehicle, because on the basis of the transverse acceleration which is not yet corrected at first, an implausible vehicle condition for the control system prevails. To improve the correction performance of the device and the method with regard to the transverse acceleration in this case to the extent that in this situation the transverse acceleration more quickly reaches the corrected value which describes the steep wall or the steep curve, it is possible to perform a correction of the value determined for the float angle in step 304. The value of the float angle is increased here as a function of the actions performed independently of the driver so that said value increases with an increase in the number of driver-independent actions. Therefore, fewer computation cycles are necessary until the corrected value of the transverse acceleration described above is reached.

The actions performed independently of the driver to be taken into account may be, as mentioned above, actions on actuators 110$ij$ with which the braking torques acting on the individual tires can be influenced. To detect these actions, for example, signals ANij representing the number of such actions performed on respective actuator 110$ij$ independently of the driver are analyzed.

Step 304 is followed by step 305. In this step, the slip angle alphah occurring on the rear axle of the vehicle is determined as a function of the float angle beta determined in step 304 and also as a function of the values obtained for the yaw omegamess and the longitudinal velocity of vehicle vl.

After step 305, step 306 is carried out. In this step, an inquiry is performed to determine whether the value of the slip angle alphah occurring on the rear axle of the vehicle is greater than a predetermined threshold value alphas and whether the steep wall condition is met. If at the same time the value of the slip angle alphah is greater than the threshold value alphas and the steep wall condition is met, then step 307 is carried out next. However, if the value of the slip angle alphah is smaller than the threshold value and/or the steep wall condition is not met, then it returns to step 302.

The structure of the inquiry conducted in step 306 is derived from the following arguments: In determining the float angle, the value aymess which is determined with sensor 105 is used for the transverse acceleration of the vehicle. When the vehicle is moving on a road surface with a transverse slope, this value aymess is falsified by the transverse acceleration component which depends on the transverse slope of the road surface. This is manifested by the fact that a change in float angle d(beta)/dt is determined even when the vehicle is traveling in a stable status on a road surface with a transverse slope, although there should not be any change in the float angle in such a situation. Consequently, the float angle beta determined increases continuously and therefore assumes large values. Accordingly, the slip angle determined on the rear axle of the vehicle also assumes a large value because it is determined as a function of the float angle.

The same situation—large values of the slip angle occurring on the rear axle of the vehicle—also occurs with an unstable driving condition of the vehicle, in particular when the vehicle is in a skid, for example. Another criterion is necessary to be able to differentiate whether the vehicle is moving on a road surface with a transverse slope or whether the vehicle is in an unstable state. For this purpose, the steep wall condition is also taken into account. As will be shown below on the basis of FIG. 4, the reaction or behavior of the driver also enters into the steep wall condition. To observe the reaction or the behavior of the driver, one option is to observe, for example, the change in steering angle d(deltamess)/dt implemented by the driver and/or the driver's operation of actuators 110ij.

In the case of stable driving on a road surface with a transverse slope, the measured slip angle alphah assumes large values, but since the vehicle is stable in this situation, the driver will not take any action to influence driving performance. In other words, neither the driver-dependent braking torques generated with actuators 110ij nor the change in steering angle d(deltamess)/dt will assume large values. However, if the vehicle is in an unstable condition, the driver will normally attempt to compensate for this unstable condition. To do so, the driver will attempt to stabilize the vehicle again by a steering correction or by braking, for example. Consequently, significant values for the change in steering angle d(deltamess)/dt or for the driver-dependent braking torques MBij generated by actuators 110ij will be detected in this situation.

The driver's reaction enters into the steep wall condition so that the steep wall condition is met at the prevailing low gradient d(deltamess)/dt of the steering angle and at small driver-dependent braking torques MBij generated by actuators 110ij.

Consequently, step 307 is carried out after step 306 when the vehicle is driving in a stable condition on a road surface with a transverse slope. If this situation is not present, in particular if the vehicle is in a skid, then it returns to step 302 after step 306.

In step 307, the transverse acceleration component ayoff which depends on the transverse slope of the road surface is determined. This can be done, for example, by starting with the rough value ayoffroh for the transverse acceleration determined in step 302 using filtering. Consequently, the transverse acceleration component which depends on the transverse slope of the road surface is determined as a function of the transverse acceleration aymess, the yaw omegamess and the longitudinal velocity vl of the vehicle.

Following step 307, step 308 is carried out. In this step, the transverse acceleration component ayoff which is determined in step 307 is tested for plausibility. To do so, first a corrected value omegakorr for the yaw of the vehicle is determined on the basis of this transverse acceleration component by using a mathematical model, for example. This corrected value omegakorr is compared with the value omegamess determined with sensor 104 for the yaw of the vehicle. For example, to do so, the difference between the two values omegakorr and omegamess is determined, and the value of this difference is compared with a predetermined threshold value S1. If the value of the difference is less than threshold value S1, which means that the transverse acceleration component ayoff determined is plausible, then step 309 is performed next. However, if it is found in step 308 that the value of the difference is greater than the threshold value and thus the determined transverse acceleration component ayoff is not plausible, then step 302 is carried out again.

In step 309, at least the corrected values aykorr for the transverse acceleration and omegakorr for the yaw of the vehicle are determined and output with the help of the transverse acceleration component ayoff which was determined in step 307 and depends on the transverse slope of the road surface. Furthermore, it is conceivable to correct other parameters as a function of the transverse acceleration component ayoff. Thus, for example, the slip angle alphah occurring on the rear axle of the vehicle could also be corrected.

After step 309, step 310 is carried out, thus completing the determination of the transverse acceleration component ayoff and the correction of the transverse acceleration of the vehicle.

It should also be pointed out that the determination of the transverse acceleration component ayoff, for example, is taking place permanently in the background with regard to the control of the parameter representing the movement of the vehicle. It should also be pointed out that at the beginning of a trip, for example, after turning the ignition key, an initialization process is first carried out in which parameters are set at a suitable initialization level.

Figure 4:
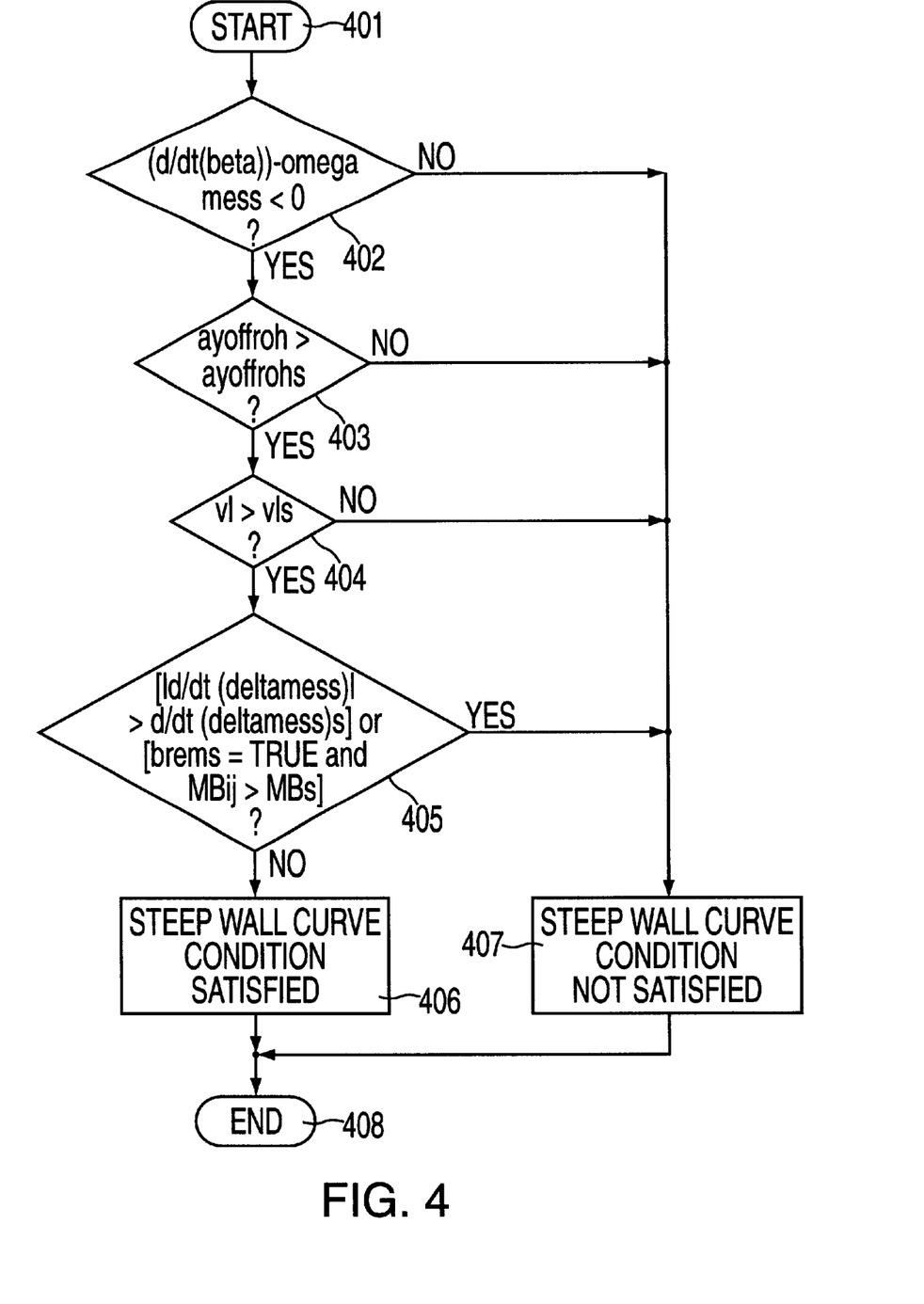
FIG. 4 shows a flow chart for ascertaining whether or not a steep curve condition prevails.

Using the flow chart shown in FIG. 4, the steep wall inquiry with which it is possible to ascertain whether the steep wall condition is met is described. This steep wall inquiry is used in steps 303 and 306 in determining the transverse acceleration component ayoff which depends on the transverse slope of the road surface, as described above in conjunction with FIG. 3.

The inquiry begins with step 401. Following this step, step 402 is carried out. In this step, a check is performed to determine whether the vehicle is in a steep curve or steep wall. This inquiry is carried out, for example, by checking the product formed from the change in float angle d(beta)/dt and the yaw omegamess detected with sensor 104. This inquiry is performed because the product of the change in float angle d(beta)/dt and the yaw omegamess is smaller than zero for a vehicle being oversteered and for a vehicle in a steep curve or steep wall. Consequently, with the inquiry performed in step 402, it is ascertained that the vehicle is oversteered and/or is in a steep curve or steep wall. However, additional inquiries are necessary to be able to ascertain which of the two states the vehicle is ultimately in, as explained below in conjunction with step 405. If the product described above is less than zero, step 403 is performed next. However, if the product is greater than zero, step 407 is carried out next.

In step 403, the rough value ayoffroh of the transverse acceleration determined in step 302 is compared with a predetermined threshold value ayoffrohs. If the rough value ayoffroh is greater than the threshold value ayoffrohs, this indicates that the vehicle is on a road surface with a transverse slope. Therefore, in this case, step 404 is carried out next. However, if it is found in step 403 that the rough value ayoffroh is smaller than threshold value ayoffrohs, then step 407 is carried out next because the vehicle is obviously not on a road surface with a transverse slope.

In step 404, a check is performed to determine whether the longitudinal velocity vl of the vehicle is greater than the value vls of a minimum longitudinal velocity. Longitudinal velocity vl of the vehicle should be greater than the value vls of the minimum longitudinal velocity in order to be able to reliably determine the transverse acceleration component which depends on the transverse slope of the road surface. If the value vl is greater than the value vls, step 405 is carried out next. However, if value vl is smaller than value vls, step 407 is carried out next.

In step 405, the monitoring of the action or response of the driver mentioned above in conjunction with FIG. 3 is performed. To do so, various inquiries are carried out in step 405. For example, with one of these inquiries, for example, the gradient d(deltamess)/dt of the steering angle which is set by the driver is checked. With a second inquiry comprising two criteria, the driver-dependent operation of actuators 110$ij$ is checked on the basis of braking torques MBij generated with actuators 110$ij$ and/or on the basis of the signal brems.

The driver's action or response is monitored for this reason because in conjunction with the slip angle occurring on the rear axle of the vehicle, it is possible to ascertain whether the vehicle is in a stable condition on a road surface with a transverse slope, or whether it is in an unstable condition, in particular, whether it is in a skid.

It is to be assumed that in the case when the vehicle is in a stable driving condition on a road surface with an inclined slope, the driver will not have any extreme reactions in the form of a strong steering action and/or a strong braking action. However, if the vehicle is in an unstable condition, in particular if it is in a skid, the driver will attempt to get the vehicle back in a stable condition through suitable strong steering and braking actions.

For this reason, the following inquiries are performed in step 405: In a first inquiry, the value of the gradient d(deltamess)/dt of the steering angle deltamess is compared with a predetermined threshold value (d(deltamess)/dt)s. If it is found in this comparison that the absolute value of the gradient is greater than the threshold value, then it can be assumed that the driver will execute strong steering movements in an attempt to bring the vehicle into a stable condition.

In a second inquiry, the driver-dependent influence on actuators is determined, using a first criterion, it is ascertained whether or not the operation of actuators 110$ij$ is performed by the driver. Operation of actuators 110$ij$ can be attributed to an action taken by the driver if the signal brems assumes the value TRUE, for example. With a second criterion, the braking torques MBij generated by actuators 110$ij$ on the respective wheels and the braking torques MBij influenced with actuators 110$ij$ on the respective wheels are monitored. It can be assumed here that the driver is performing strong braking actions when the values of he braking torques MBij are greater than a predetermined threshold value MBs.

If at least one of the two inquiries is satisfied in step 405, i.e., if the absolute value of the gradient d(deltamess)/dt of the steering angle is greater than the threshold value d(deltamess)/dt)s or if the braking torques MBij generated by actuators 110$ij$ or influenced by actuators 110$ij$ are greater than the threshold value MBs for the case when the signal brems has the value TRUE, then it can be assumed that the vehicle is not in a stable condition. Consequently, step 407 is carried out after step 405 in this case. However, if neither inquiry is satisfied, then it can be assumed that the vehicle is in a stable condition and consequently step 406 is carried out following step 405.

It should be pointed out that it is conceivable for the driver-dependent influence on the driving torque delivered by engine 111 to be monitored in this connection.

In step 406, such a value is assigned in block 202 to a variable which serves to indicate whether or not the steep wall condition is met that it is possible to ascertain on the basis of this value that the steep wall condition is met. In step 407, however, a value is assigned to the same variable on the basis of which it is possible to ascertain that the steep wall condition is not met. This variable is evaluated in steps 303 and 306 which are shown in FIG. 3, for example.

Following both steps 406 and 407, step 408 is carried out, terminating the steep wall inquiry.

The embodiment of the two flow charts shown in FIGS. 3 and 4 is not intended to have any restrictive effect on the idea that is essential to the present invention.

What is claimed is:

1. A device for controlling a movement parameter representing a movement of a vehicle, comprising:
   a first arrangement detecting at least the movement parameter and determining a transverse acceleration parameter indicative of a transverse acceleration of the vehicle; and
   a second arrangement for determining a transverse acceleration component dependent upon a transverse slope of a road surface, and for correcting the determined transverse acceleration of the vehicle at least as a function of the transverse acceleration component,
   wherein the second arrangement:
      determines a slip angle occurring on a rear axle of the vehicle,
      detects a vehicle condition, during which the transverse acceleration component is determined, as a function of the slip angle, and
      determines whether the determined transverse acceleration component is plausible.

2. The device according to claim 1,
   wherein the first arrangement detects a first parameter corresponding to a yaw of the vehicle and second parameters corresponding to wheel velocities, and
   wherein a further parameter representing a longitudinal velocity of the vehicle is determined as a function of the wheel velocities.

3. The device according to claim 2, wherein the transverse acceleration component is determined as a function of the first parameter, the transverse acceleration parameter and the further parameter.

4. The device according to claim 2, wherein the slip angle is determined as a function of a third parameter corresponding to a float angle of the vehicle, the first parameter and the further parameter.

5. The device according to claim 4, wherein the second arrangement determines the float angle as a function of the first parameter, the transverse acceleration parameter and the further parameter.

6. The device according to claim 5,
   wherein the vehicle includes actuators influencing braking torques acting on individual wheels of the vehicle, and wherein the second arrangement determines the float angle of the vehicle as a function of predetermined actions of the actuators which are performed independently of a driver to control the movement parameter.

7. The device according to claim 1,
wherein the second arrangement detects the vehicle condition as a function of the slip angle by comparing the slip angle with a predetermined threshold value, and
wherein the vehicle condition is detected when the slip angle is greater than the predetermined threshold value.

8. A device for controlling a movement parameter representing a movement of a vehicle, comprising:
a first arrangement detecting at least the movement parameter and determining a transverse acceleration parameter indicative of a transverse acceleration of the vehicle; and
a second arrangement performing at least one of:
determining a transverse acceleration component dependent upon a transverse slope of a road surface, and
correcting the determined transverse acceleration of the vehicle at least as a function of the transverse acceleration component,
wherein the second arrangement:
determines a slip angle occurring on a rear axle of the vehicle,
detects a vehicle condition, during which the transverse acceleration component is determined, as a function of the slip angle, and
determines whether the determined transverse acceleration component is plausible;
wherein
the vehicle includes actuators influencing a braking torque action on individual wheels of the vehicle;
the first arrangement detects a steering angle of the vehicle; and
the second arrangement, in determining the vehicle condition, monitors at least one of the actuators and the steering angle for indication if a driver of the vehicle has initiated predetermined actions, the vehicle condition being detected when the braking torque generated by the driver is smaller than a first predetermined threshold value and when a gradient of the steering angle is smaller than a second predetermined threshold value.

9. A device for controlling a movement parameter representing a movement of a vehicle, comprising:
a first arrangement detecting at least the movement parameter and determining a transverse acceleration parameter indicative of a transverse acceleration of the vehicle; and
a second arrangement performing at least one of:
determining a transverse acceleration component dependent upon a transverse slope of a road surface, and
correction the determined transverse acceleration of the vehicle at least as a function of the transverse acceleration component,
wherein the second arrangement:
determines a slip angle occurring on a rear axle of the vehicle,
detects a vehicle condition, during which the transverse acceleration component is determined, as a function of the slip angle, and
determines whether the determined transverse acceleration component is plausible;

wherein:
the first arrangement detects a first parameter corresponding to a yaw of the vehicle and second parameters corresponding to wheel velocities;
a further parameter representing a longitudinal velocity of the vehicle is determined as a function of the wheel velocities;
a first value of the first parameter is determined as a function of the determined transverse acceleration component, and a second value of the first parameter is determined by the first arrangement;
in determining whether the determined transverse acceleration component is plausible, the second arrangement determines a difference between the first value and the second value and compares the difference with a predetermined threshold value; and
the second arrangement corrects the transverse acceleration of the vehicle when the difference is smaller than the predetermined threshold value.

10. A method of controlling a movement parameter representing a movement of a vehicle, comprising the steps of:
determining a transverse acceleration of the vehicle;
performing at least one of the following:
determining a transverse acceleration component relating to a transverse slope of a road surface, and
correcting the determined transverse acceleration of the vehicle as a function of the transverse acceleration component;
determining a slip angle occurring on a rear axle of the vehicle;
determining a condition of the vehicle, in which the transverse acceleration component is determined, as a function of the slip angle; and
determining whether the determined transverse acceleration component is plausible.

11. A device for controlling a movement parameter representing a movement of a vehicle, comprising:
means for detecting at least the movement parameter;
first means for determining a transverse acceleration parameter indicative of a transverse acceleration of the vehicle;
second means for determining a transverse acceleration component dependent upon a transverse slope of a road surface so as to provide a determined transverse acceleration component of the vehicle, wherein the second means for determining operates to:
determine a slip angle occurring on a rear axle of the vehicle,
detect a vehicle condition, during which the transverse acceleration component is determined, based on the slip angle, and
determine whether the determined transverse acceleration component is plausible; and
means for correcting the determined transverse acceleration of the vehicle based on at least the transverse acceleration component.

12. A method of modifying a movement parameter of a vehicle, comprising the steps of:
determining a transverse acceleration component relating to a transverse slope of a road surface;
determining if a vehicle condition is met;
determining a slip angle parameter of a rear axle of the vehicle if the vehicle condition is met;
determining if the slip angle parameter is greater than a threshold;

calculating a new transverse acceleration component if the vehicle condition is met and the slip angle parameter is greater than the threshold;

determining if the new transverse acceleration component is plausible; and correcting the transverse acceleration component of the vehicle based on the new transverse acceleration component if the new transverse acceleration component is plausible.

* * * * *